(12) United States Patent
Hafeez et al.

(10) Patent No.: US 12,362,897 B2
(45) Date of Patent: *Jul. 15, 2025

(54) TDD CONFIGURATION COORDINATION FOR NETWORKS USING ADJACENT BANDS

(71) Applicant: CHARTER COMMUNICATIONS OPERATING, LLC, St. Louis, MO (US)

(72) Inventors: Abdulrauf Hafeez, Cary, NC (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,593

(22) Filed: Aug. 14, 2023

(65) Prior Publication Data

US 2023/0388095 A1 Nov. 30, 2023

Related U.S. Application Data

(63) Continuation of application No. 17/069,294, filed on Oct. 13, 2020, now Pat. No. 11,728,958.

(51) Int. Cl.
H04W 24/02 (2009.01)
H04L 5/14 (2006.01)
H04W 16/18 (2009.01)

(52) U.S. Cl.
CPC ............ *H04L 5/14* (2013.01); *H04W 16/18* (2013.01); *H04W 24/02* (2013.01)

(58) Field of Classification Search
CPC .......... H04L 5/14; H04W 24/02; H04W 16/18
See application file for complete search history.

(56) References Cited

U.S. PATENT DOCUMENTS

| | | | |
|---|---|---|---|
| 6,047,176 | A | 4/2000 | Sakamoto et al. |
| 9,439,166 | B2 | 9/2016 | Siomina et al. |
| 9,648,605 | B2 | 5/2017 | Lee et al. |
| 10,178,700 | B2 | 1/2019 | Eriksson et al. |
| 10,291,379 | B2 | 5/2019 | Kadous et al. |
| 10,462,795 | B2 | 10/2019 | Tiirola et al. |
| 10,700,775 | B2 | 6/2020 | Novlan et al. |
| 2003/0072420 | A1 | 4/2003 | Feigenbaum |
| 2005/0122999 | A1 | 6/2005 | Scherzer et al. |
| 2013/0028149 | A1 | 1/2013 | Chen et al. |
| 2013/0121189 | A1 | 5/2013 | Bhattad et al. |
| 2013/0208587 | A1 | 8/2013 | Bala et al. |
| 2013/0208632 | A1 | 8/2013 | Williams et al. |
| 2013/0242812 | A1* | 9/2013 | Khoryaev ............... H04L 1/189 370/278 |
| 2014/0086112 | A1 | 3/2014 | Stern-Berkowitz et al. |

(Continued)

FOREIGN PATENT DOCUMENTS

CN 105122871 B 12/2018

*Primary Examiner* — Hassan A Phillips
*Assistant Examiner* — Prenell P Jones
(74) *Attorney, Agent, or Firm* — Patent Beach PC

(57) ABSTRACT

Various embodiments comprise systems, methods, architectures, mechanisms and apparatus for automatically coordinating time domain duplex (TDD) configurations and transmission parameters among wireless network providers operating on adjacent TDD channels and/or bands in proximity of each other to avoid cross link interference (CLI).

20 Claims, 4 Drawing Sheets

(56) References Cited

U.S. PATENT DOCUMENTS

| | | | |
|---|---|---|---|
| 2014/0133369 A1* | 5/2014 | Cheng | H04L 5/0073 370/280 |
| 2014/0293843 A1 | 10/2014 | Papasakellariou et al. | |
| 2014/0301255 A1 | 10/2014 | Yin et al. | |
| 2015/0043390 A1* | 2/2015 | Wang | H04W 24/02 370/280 |
| 2015/0124943 A1 | 5/2015 | Oksman et al. | |
| 2015/0281974 A1 | 10/2015 | Ghasemzadeh et al. | |
| 2015/0327269 A1 | 11/2015 | Kim et al. | |
| 2015/0349931 A1* | 12/2015 | Damnjanovic | H04W 72/0446 370/280 |
| 2015/0358963 A1 | 12/2015 | Sawai | |
| 2015/0373550 A1* | 12/2015 | Hong | H04L 5/001 370/254 |
| 2016/0073448 A1 | 3/2016 | Strobel et al. | |
| 2016/0113037 A1 | 4/2016 | Mizusawa | |
| 2016/0164656 A1* | 6/2016 | Khoryaev | H04L 67/02 370/280 |
| 2016/0183232 A1 | 6/2016 | Stirling-Gallacher et al. | |
| 2016/0205680 A1* | 7/2016 | Nguyen | H04W 72/0446 370/280 |
| 2016/0352455 A1 | 12/2016 | Li et al. | |
| 2017/0048047 A1* | 2/2017 | Kadous | H04L 1/1858 |
| 2017/0295497 A1 | 10/2017 | MacMullan et al. | |
| 2017/0359729 A1* | 12/2017 | Nielsen | H04W 72/0446 |
| 2018/0220301 A1 | 8/2018 | Gallagher et al. | |
| 2018/0294837 A1 | 10/2018 | Chapman et al. | |
| 2019/0238304 A1 | 8/2019 | Estevez | |
| 2019/0296792 A1 | 9/2019 | Domanovitz et al. | |
| 2020/0112953 A1 | 4/2020 | Bendlin et al. | |
| 2020/0145967 A1 | 5/2020 | Park et al. | |
| 2020/0229009 A1 | 7/2020 | Xu et al. | |
| 2020/0252847 A1 | 8/2020 | Park et al. | |
| 2020/0267738 A1* | 8/2020 | Barbu | H04W 24/10 |
| 2021/0105637 A1 | 4/2021 | Whitley | |
| 2021/0328692 A1* | 10/2021 | Zhang | H04B 7/088 |
| 2021/0368481 A1 | 11/2021 | Jo et al. | |
| 2021/0399821 A1* | 12/2021 | Chung | H04L 5/14 |
| 2022/0030456 A1* | 1/2022 | Sundberg | H04B 17/336 |
| 2022/0046432 A1* | 2/2022 | Li | H04W 24/02 |
| 2022/0103333 A1* | 3/2022 | Ghozlan | H04W 88/08 |
| 2022/0110136 A1* | 4/2022 | Li | H04W 92/20 |
| 2022/0159596 A1* | 5/2022 | Kim | H04J 11/00 |
| 2022/0263240 A1 | 8/2022 | Leather et al. | |
| 2022/0377760 A1* | 11/2022 | Sun | H04W 72/23 |
| 2022/0400386 A1* | 12/2022 | Furuichi | H04W 56/001 |
| 2022/0407672 A1* | 12/2022 | Sandberg | H04B 17/336 |

* cited by examiner

TDD CONFIGURATION COORDINATION FOR NETWORKS USING ADJACENT BANDS

PRIORITY

This application is a continuation of and claims priority to co-owned and co-pending U.S. patent application Ser. No. 17/069,294 of the same title filed Oct. 13, 2020, and issuing as U.S. Pat. No. 11,728,958 on Aug. 15, 2023, which is incorporated herein by reference in its entirety.

FIELD OF THE DISCLOSURE

The present disclosure generally relates to wireless communications systems and related networks, and more particularly to coordinating time domain duplex (TDD) operating parameters of geographically proximate base station equipment of different service providers to reduce interference and promote efficient spectrum use.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to deploy, for example, indoor voice and data services to enterprises and other customers. For both macrocell RANs and small/micro cell RANs, increasing demands for wireless throughput make access to additional wireless spectrum desirable.

Spectrum bands designated to be frequency domain duplex (FDD) have separate frequency assignments for downlink (DL) and uplink (UL) operation. The UL and DL portions are separated in frequency to avoid interference. However, spectrum bands designated to be time domain duplex (TDD) have one common frequency assignment for both DL and UL operation whereas the operations are separated in time domain.

An example TDD band which has recently become available is that of the citizens broadband radio service (CBRS), a 150 MHz band between 3.55 GHz and 3.70 GHz. Access is currently granted to Citizens Broadband Radio Service Devices (CBSDs) operating according to General Authorized Access (GAA) from 3.55 GHz to 3.65 GHz, with full access to 3.70 GHz expected in the future.

As such, multiple wireless network operators are in the process of deploying base station (BS) equipment capable of using the additional spectrum to offer their respective subscribers new wireless service offerings and/or augment existing wireless service offerings. While the operators try to coordinate their new/augmented wireless service offerings to avoid the inevitable conflicts in using unlicensed spectrum, many problems still exist.

Moreover, new TDD bands have been designated by the FCC to operate in adjacent frequency assignments, e.g. the C Band (3.7-3.98 GHz) which is immediately adjacent to the CBRS Band. TDD systems are highly susceptible to cross link interference (CLI), which arises when the nodes of one operator operate in a different uplink/downlink mode than the nodes of another operator located nearby and operating in the same band or an adjacent band. The BS of one operator operating in DL mode may interfere with the BS of another operator operating nearby in UL mode. Similarly, the UE of one operator operating in UL mode may interfere with the UE of another operator operating nearby in DL mode.

One solution to this TDD interference problem is to require all operators of same or adjacent bands to synchronize their networks and to use a common or equivalent TDD configuration (i.e., have all operators agree to use the same sequence and timing of DL and UL modes). However, this is not always achievable, and suffers from various limitations, as follows:

(1) Forcing the same TDD configuration in same or adjacent bands may be too restrictive for some uses. While the prevalent mobility use requires a DL heavy TDD configuration, an UL heavy TDD configuration is desirable for video surveillance. These two divergent uses may need to coexist side by side in a dense urban environment.

(2) An operator forced to use an undesirable TDD configuration may end up needing three times as much spectrum to accommodate the same amount of traffic. For example, the DL:UL ratio for LTE TDD Config 2 is 3:1, while it is 1:3 for LTE TDD Config 0.

(3) Requiring the same TDD configuration for all users of the same or adjacent bands is not a scalable solution.

(4) Achieving frame synchronization based on requirements for one technology (e.g. 3GPP) may be problematic for other (e.g. proprietary) technologies or in some scenarios, e.g. indoors Another solution for operators intending to use different TDD configurations is to coordinate their sites, such as providing sufficient distance between them. However, this too is not always achievable, and suffers from various limitations, as follows:

(1) Manual site-by-site coordination among operators is not scalable as the number of operators, sites and bands grows.

(2) Band regulations, such as transmit powers, may be wildly different in adjacent bands, such as CBRS and C Band. This makes site distancing requirements to be asymmetric. For example, two potentially interfering operators do not have equal leverage in mutual negotiations since one operator may provide services that tolerate interference coming from another operator's site at 300 m distance, while the other operator may provide services that require a minimum distance of 400 m.

SUMMARY

Various deficiencies in the prior art are addressed by systems, apparatus, and methods providing a time domain duplex (TDD) Configuration Controller (TCC) for automatically coordinating TDD configurations and transmission parameters among wireless network providers operating on adjacent TDD channels and/or bands in proximity of each other to avoid cross link interference (CLI).

A method according to an embodiment for managing time domain duplex (TDD) parameters of provider equipment (PE) nodes located in a geographical area of interest and configured for wireless communication comprises: receiving, for each node, network information indicative of node coverage and interference areas, and desired TDD configurations; using the network information received for the nodes to identify potential interference among nodes due to the use of desired TDD configurations; determining, for each node, one or more allowed TDD configurations to avoid interference with other nodes; and providing each node with an allowed TDD configuration.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
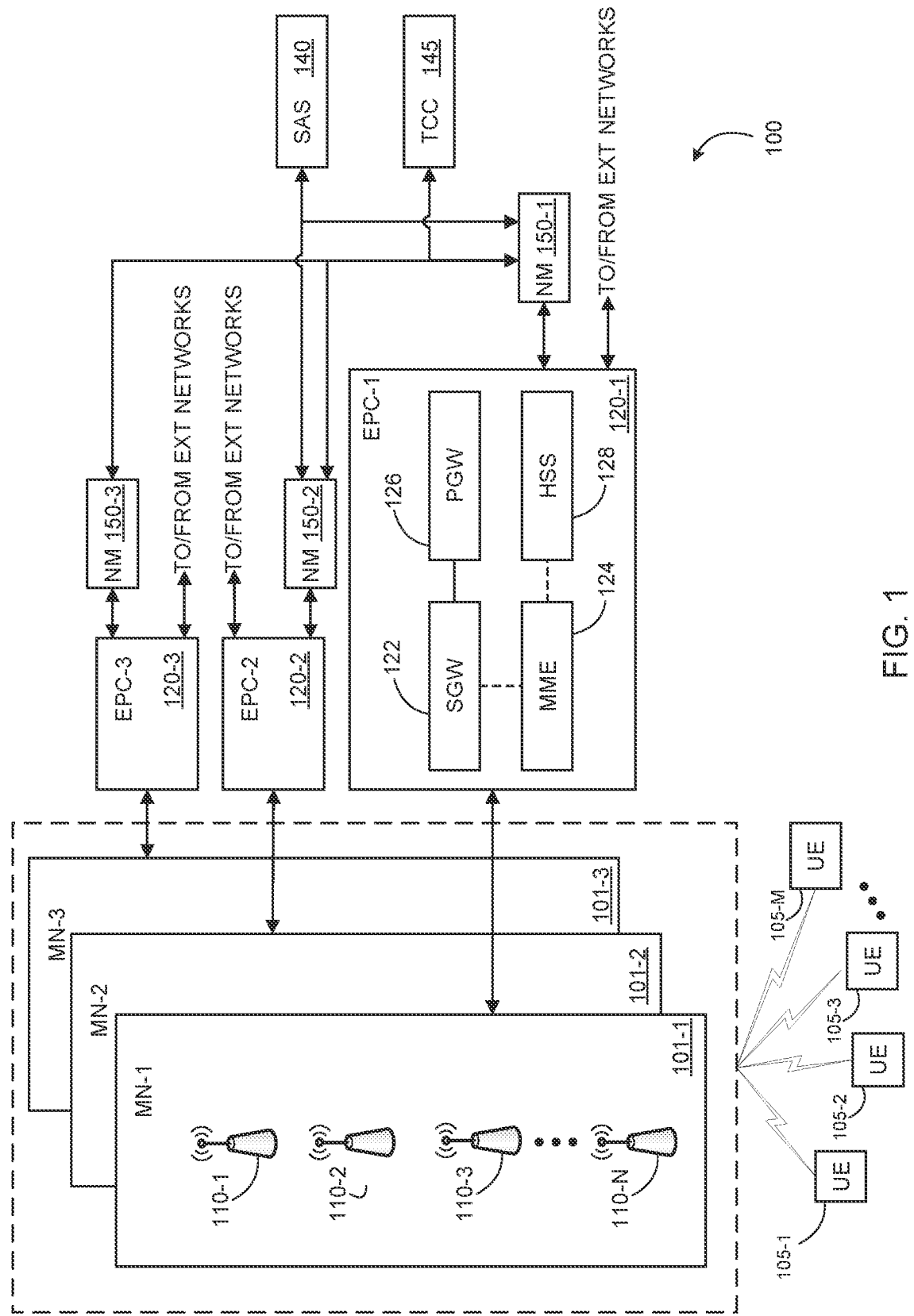
FIG. 1 depicts a block diagram of a simplified multiple operator mobile network services architecture useful in understanding the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Mobile network providers desire to provide optimal cellular coverage for users of cellular/mobile network services. Mobile network providers have deployed universal mobile telecommunications system (UMTS) nodes and/or high speed packet access (HSPA) nodes to provide coverage to the users of their network. These deployments have been augmented by the deployment of third generation partnership project (3GPP) long term evolution (LTE) coverage (e.g., 4G/LTE) to increase network performance, provide new services and so on. New and planned deployment of 5G New Radio (5G NR) and related technologies provides further improvements in network performance as well new or improved network services.

The various embodiments will primarily be discussed within the context of multiple 3GPP LTE mobile networks having overlapping coverage areas or footprints, and utilizing compatible provider equipment (PE) and wireless devices (WD) such as user equipment (WD). However, it will be appreciated by those skilled in the art and informed by the present teaching that the various embodiments are applicable to older mobile network technologies, and especially well-suited for use in the present and upcoming deployments of 5G cellular network equipment and the use of such equipment to support both existing and new network services. As such, it is contemplated that the various embodiments disclosed herein are applicable to all of the current and currently contemplated mobile and cellular networking technologies, services and applications.

FIG. 1 depicts a block diagram of a simplified multiple operator mobile network services architecture useful in understanding the various embodiments. Specifically, FIG. 1 depicts a simplified multiple operator mobile network services architecture in which base stations (e.g., eNodeBs) and other provider equipment (PE) for each of, illustratively, three mobile network operators are deployed in a geographical region and configured to provide mobile services to subscribers via respective groups of user equipment (UE) utilizing the network services (e.g., voice, streaming media, data upload/download etc.). The simplified multiple operator mobile network services architecture 100 of FIG. 1 is a representation of a multiple operator network services environment useful in explaining the various embodiments, and should not be construed as the only type of network services architecture or operator environment benefiting from the various embodiments.

FIG. 1 depicts a first plurality of provider equipment (PE) mobile network nodes 110-1 through 110-N (collectively nodes 110), comprising base stations (BSs), eNodeBs, and the like, the first plurality of nodes 110 forming a first mobile network 101-1, which is connected to a first evolved packet core (EPC) 120-1 so as to provide thereby network services to a connected first plurality of user equipment (UE), such as via interconnectivity with one or more external networks (not shown).

FIG. 1 depicts a second mobile network 101-2 formed via a second plurality of PE mobile network nodes 110 (not shown) and connected to a second evolved packet core (EPC) 120-2 so as to provide thereby network services to a respective connected second plurality of UE.

FIG. 1 depicts a third mobile network 101-3 formed via a third plurality of PE mobile network nodes 110 (not shown) and connected to a third evolved packet core (EPC) 120-3 so as to provide thereby network services to a respective connected third plurality of UE.

For simplicity of discussion, it is assumed that the first, second, and third mobile networks 101 and EPCs 120 are associated with different mobile services operators (having different though possibly overlapping subscriber bases), but operate in a substantially similar manner. As such, the below discussion will be primarily directed to operations associated with the first mobile services operator, which discussion is also applicable to other mobile services operators. The mobile networks 101 may comprise one or more of a E-UTRAN network, LTE access network, a 5G network with NG-RAN and 5GC, or any other type of mobile network suitable for implementing the various mobile network functions described herein. As depicted in FIG. 1, the first 101-1 and second 101-2 mobile networks use both licensed and unlicensed spectrum, whereas the third mobile network 101-3 uses only licensed spectrum. As such, the first 101-1 and second 101-2 mobile networks are also depicted as cooperating (via respective management entities) with a Spectrum Access System (SAS) 140 configured to manage unlicensed spectrum use, whereas the third mobile network 101-3 does not need such cooperation. The various embodiments are applicable to mobile networks using licensed spectrum, unlicensed spectrum, or a combination of licensed and unlicensed spectrum as will be discussed in more detail below.

The nodes 110 may comprise macrocells, small cells, microcells and the like such as eNodeBs, cellular network base stations, 4G/5G repeaters, and similar types of provider equipment nodes. The nodes 110 may include nodes that use licensed 3G/4G/LTE/5G spectrum, unlicensed spectrum such as citizens broadband radio service (CBRS) spectrum, or a combination of licensed and unlicensed spectrum. In the case of nodes 110 having Citizens Broadband Radio Service Device (CBSD) capability, allocations of CBRS spectrum are provided via the Spectrum Access System (SAS) 140.

User equipment (UE) 105-1 through 105-M (collectively UE 105) is depicted as being configured for wirelessly communicating with one or more mobile network nodes 110 of the available mobile networks 101, depending upon the mobile network operator to which the UE is subscribed or otherwise authorized to receive mobile network services.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed 3G/4G/LTE/5G spectrum, unlicensed spectrum such as CBRS spectrum, or a combination of licensed and unlicensed spectrum. In the case of nodes 110 having CBSD capability, allocations of CBRS spectrum are provided via 140.

The nodes 110 of the three mobile networks 101-1, 101-2, 101-2 are configured to communicate with UE 105 as discussed herein. While the nodes 110 and UE 105 may operate in accordance with various radio access technologies (RATs), the embodiments will be discussed within the context of those nodes 110 and UE 105 configured to communicate with each other as Citizens Broadband Radio Service Devices (CBSDs) configured for operation within the Citizens Broadband Radio Service (CBRS), such as the 100 MHz band from 3.55 GHz to 3.65 GHz, the 150 MZ band between 3.55 GHz and 3.70 GHz, or some other spectral range as defined by the relevant authorities.

As depicted, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within or used to manage an evolved packet core and related communications therewith as will be known to those skilled in the art.

The SGW 122 and PGW 126 handle user data or data plane (DP) functions; they transport the internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnect between the radio-side (e.g., via a backhaul connection to the E-UTRAN 101 as depicted or some other wireless network) and the EPC 120. As its name indicates, this gateway serves the UE by routing the incoming and outgoing IP packets. The SGW 122 is the anchor point for intra-LTE mobility (i.e. in case of handover between eNodeBs 110) and between LTE and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as UE messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

As depicted in FIG. 1, a Spectrum Access System (SAS) 140 communicates with each EPC 120 via its respective network manager 150 (optionally directly to the EPC 120) and is configured to control access to the CBRS frequency band for RANs and other CBSD devices such as nodes 110 and UEs 105. Generally speaking, the SAS 140 is configured to ensure that the CBRS frequency band is allocated in accordance with the regulations promulgated by the relevant authorities. The SAS 140 may also communicate with the network manager 150 to perform various tasks in accordance with the embodiments. It is noted that more than one SAS 140 may be used within the context of the various embodiments, and that information may be shared between each SAS to effect the various functions of the SAS 140.

As depicted in FIG. 1, a time domain duplex (TDD) Configuration Controller (TCC) 145 communicates with each EPC 120 via its respective network manager 150 (optionally directly to the EPC 120) and is configured to manage the TDD operating parameters of the PE nodes 110 within a geographical area of interest, such as geographical areas including nodes having overlapping coverage areas associated with any of the three mobile networks 101-1, 101-2, and 101-3, as will be described in more detail below.

Generally speaking, the TCC receives (e.g., from the network managers 150 or other PE entities), for each PE node in a geographical area of interest, a desired TDD configuration and network information indicative of coverage and interference areas for each of the base station (and possibly UE) nodes of the respective mobile network or network owner/operator within a geographical area of interest. The information indicative of the coverage and interference areas of a node may comprise, illustratively, one or more of a measured or calculated coverage and interference areas of the node (e.g., such as by the respective provider), a node site location, a node antenna height, a node RF filter and antenna characteristics, a node transmission parameters, and corresponding information for UEs, if possible. The information enables the TCC to calculate or otherwise determine node coverage areas or coverage area contours and, therefore, the overlapping of such coverage areas and also interference areas or interference coupling or edges between nodes The TCC may also use known wireless standard(s) (such as 3GPP) or regulatory limits for RF transmission and reception, such as out of band emissions, in band emissions, blocking, out of band selectivity, in band selectivity, etc.

The TCC is configured to identify or determine nodes or node pairs having overlapping coverage areas and different desired TDD configurations, in which case the TCC determines the interference and assigns a common TDD configuration to both nodes in the node pair if the interference is below a threshold. The TCC may generate one or more messages configured to cause assignment of determined TDD configurations to nodes in the geographical area of interest, such as messages transmitted to the network managers associated with the respective nodes.

Other information received by the TCC may comprise one or more of identification of owner/operator, other BS or UE parameters (e.g., scheduled activities, QoS constraints, application types or priority, use case types or priority, and/or other information).

The TCC may determine the geographical coverage areas/contours of each of the various nodes, and then group those nodes having overlapping coverage areas into clusters. If the various nodes have differing desired TDD configurations, the TCC may determine which TDD configuration should be primarily used, which secondarily, and so on. Adjacent nodes, or nodes forming node pairs, with different desired TDD configurations are coordinated by the TCC selecting a common TDD configuration (e.g., the primary or secondary TDD configuration) based on various mechanisms/criteria, as will be discussed below with respect to FIGS. 3-4.

Further, the TCC may be configured to periodically or even continually process each of a plurality of individual geographical areas of interest or node groups of interest and the like of one or more mobile network footprints to effect, thereby, a continual "tuning" of the BS parameters.

Various elements or portions thereof depicted in FIG. 1 and having functions described herein are implemented at least in part as computing devices having communications capabilities, including for example the UE 105, nodes 110, SAS 140, TCC 145, NM 150 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

CBSD Registration & Deregistration

Generally speaking, before a new CBSD (e.g., a PE node 110 being added to a network 101) can transmit in the CBRS frequency band, it needs to register with the SAS 140. The CBSD sends a registration request to the SAS 140 containing information about its installation parameters, such at the owner, location, and transmit characteristics of a node 110. The SAS 140 responds to the CBSD with a registration response. If the SAS 140 approves the registration request, then the SAS 140 will respond with a CBSD ID, and the CBSD is registered. If the SAS 140 rejects the registration request, then the SAS 140 will respond with an error message. The CBSD needs to correct the error and send another registration request.

Normally the CBSD requires CPI validation. In a single-step registration process, the CPI provides the installation parameters of the CBSD (signed with its own CPI certificate) to the CBSD. Then, the CBSD sends a registration request to the SAS including the signed installation parameters in a "cpiSignatureData" field. In a multi-step registration process, the CPI uses the SAS Portal (or another user interface that's integrated with the SAS Portal) to send the installation parameters to the SAS. Then, the CBSD sends a registration request to the SAS without installation parameters. The SAS combines the information from the SAS Portal and the CBSD to process the registration request.

If a CBSD needs to be decommissioned or simply moved, it will first send a deregistration request to the SAS. Thereby indicating that the CBSD no longer wishes to be listed in the SAS with the parameters that it sent in its registration request. If a CBSD subsequently needs to transmit again, then the CBSD may send a registration request with updated parameters later. Therefore, in operation a CBSD such as a node 110 registers with the SAS 140 (directly or via PE such as a network manager) by providing the SAS 140 with location and capability information as discussed above.

A UE wireless device 105 such as a user terminal, fixed wireless access device, IoT device or other UE waits for authorization from its corresponding CBSD (e.g., corresponding node 110) before transmitting in the CBRS frequency band. Each CBSD such as a node 110 operating within the CBRS frequency band will transmit and receive wireless data within one or more respective coverage areas as discussed above, wherein some of the coverage areas may be overlapping.

TDD Configuration Coordination

Figure 2:
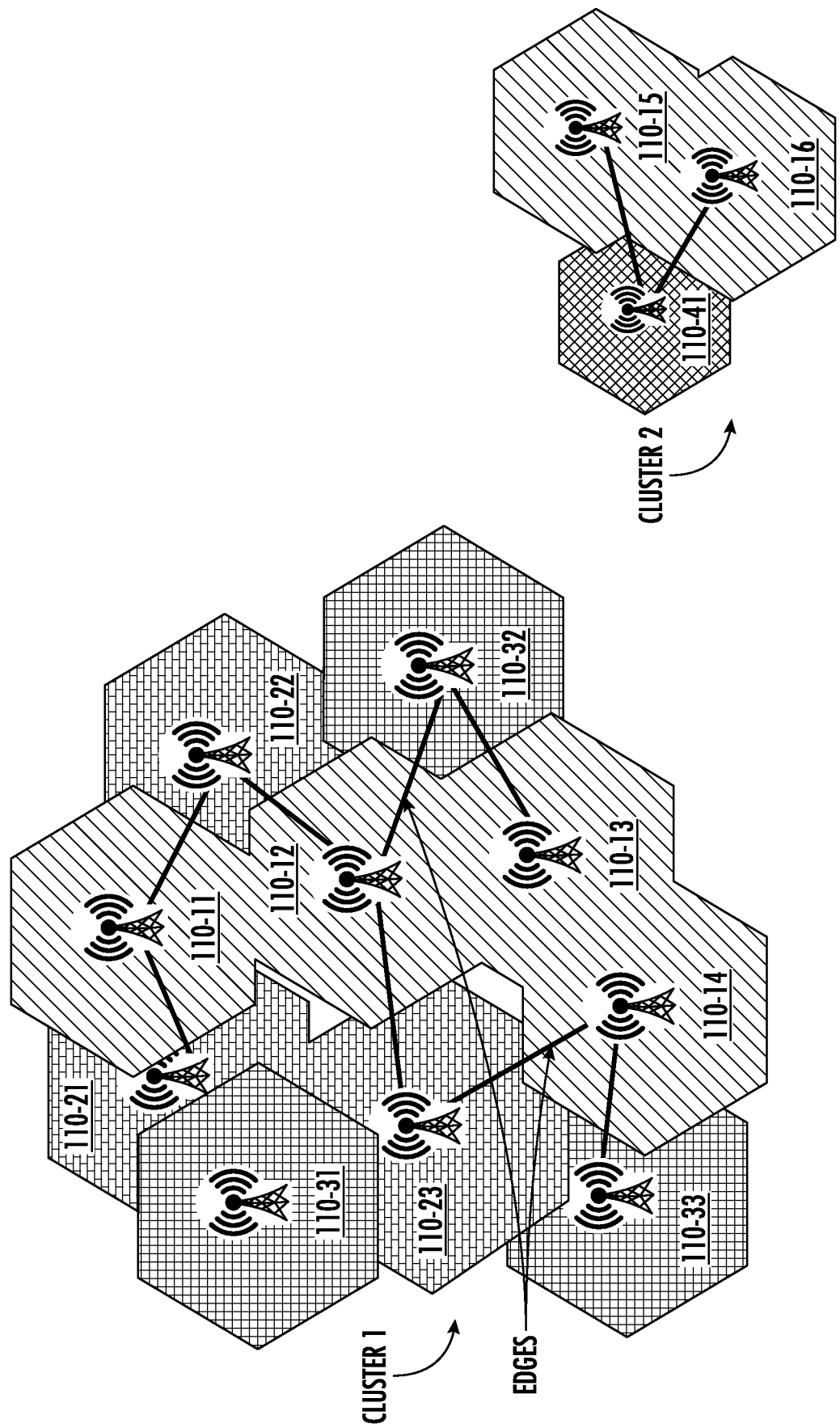
FIG. 2 depicts a graphical representation of overlapping coverage areas of a plurality of base station nodes of multiple service providers in an area of interest.

FIG. 2 depicts a graphical representation of overlapping coverage areas of a plurality of provider equipment (PE) nodes such as base station nodes of multiple service providers in an area of interest, where each PE node 110 is associated with one of four mobile services operators or providers such that coverage areas of the different providers overlap in several places. Where coverage areas of different providers overlap, node-node and/or UE-UE CLI is a potential problem. The TCC 145 of FIG. 1 is configured to manage the TDD operating parameters of the PE nodes 110 located in any coverage area of interest and of any mobile services operator so that node-node and/or UE-UE CLI may be greatly reduced, if not eliminated.

Referring to FIG. 2, the graphical representation of an area of interest includes a plurality of PE nodes 110, which are grouped into first and second clusters. A cluster is a group of adjacent PE nodes 110 having overlapping coverage areas.

The first cluster (Cluster 1) is depicted as comprising four nodes of a first provider 110-11 through 110-14, three nodes of a second provider 110-21 through 110-23, and three nodes of a third provider 110-31 through 110-23. The second cluster is depicted as comprising two nodes of the first provider 110-15 and 110-16, and one node of a fourth provider 110-41.

It is noted that the coverage area of any PE node 110 depends upon the topography of the proximate area (flat, forest, mountain, urban, buildings/obstacles, and so on), the height of node antenna, the signal power, spectral allocation, encoding techniques, and so on.

Each pair of PE nodes 110 having overlapping coverage areas may be referred to as a node pair, and PE nodes may be included in multiple node pairs.

FIG. 2 also depicts a black line denoted as an "edge" between several node pairs, which is indicative of an amount of node-node (or UE-UE) CLI exceeding a threshold level. In particular, the node pairs exhibiting the excessive CLI indicative edge are: 110-11 and 110-21, 110-11 and 110-22, 110-22 and 110-12, 110-12 and 110-32, 119-12 and 110-23, 110-32 and 110-13, 110-21 and 110-14, 110-33 and 110-14 in Cluster 1, and 110-41 and 110-15, and 110-41 and 110-16 in Cluster 2. It is noted that nodes of the same operator or using the same TDD operating parameters will not experience node-node CLI.

Generally speaking, the TCC 145 autonomously coordinates TDD configurations and transmission parameters to be used by wireless network nodes 110 operating on the same or adjacent TDD bands in proximity of each other, such as occurs where multiple mobile services operator have deployed PE nodes such as base stations that are configured to operate in adjacent bands. The TCC 145 provides a mechanism by which operating parameters of PE nodes of multiple operators are automatically adjusted to avoid, illustratively, the cross link interference (CLI) which often arises when the nodes of one operator operate in a different uplink/downlink mode than the nodes of another operator located nearby and operating in the same band or an adjacent band. The PE node (i.e., BS/eNodeB) of one operator operating in DL mode may interfere with the BS of another operator operating nearby in UL mode. Similarly, the UE of one operator operating in UL mode may interfere with the UE of another operator operating nearby in DL mode.

The TCC employs some or all of the following information to coordinate TDD configuration and transmission parameters: (1) Mobile service operators' desired TDD configurations; (2) Operating bands/blocks/frequency ranges; (3) Site locations and heights for BSs (as well as UEs if fixed); (4) BS and UE transceiver parameters; (5) BS and UE antenna and filter characteristics; and/or (6) other information or parameters. Based on the information and knowledge of standard specifications and regulatory limitations, the TCC determines the TDD configurations to be used by networks to avoid cross link interference based on given criteria.

Figure 3:
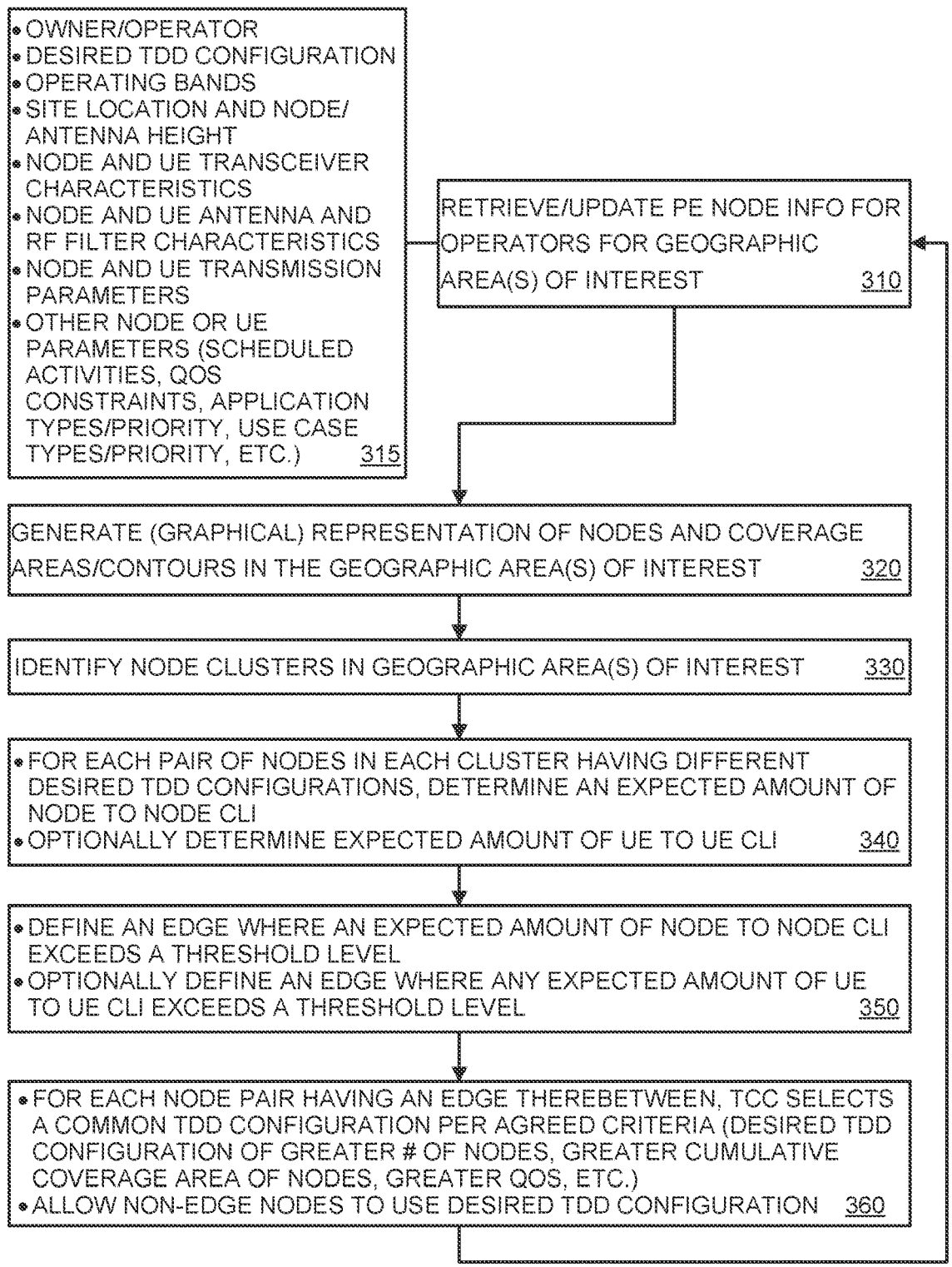
FIG. 3 depicts a TDD management method according to an embodiment.

FIG. 3 depicts a TDD management method according to an embodiment. Specifically, FIG. 3 depicts a method 300 suitable for use by the TCC 145 to automatically manage TDD configuration and transmission parameters of adjacent PE nodes of multiple wireless networks operating on adjacent TDD channels and/or bands in proximity of each other in a manner tending to reduce cross link interference (CLI).

At step 310, the method 300 retrieves or updates base station (bs) node information for operators for area(s) of interest. Referring to box 315, the node information may comprise one or more of identification of owner/operator, desired TDD configuration, desired or necessary operating bands, site location and/or antenna height, BS or UE transceiver characteristics, BS or UE antenna and radio frequency (RF) filter characteristics, node and UE transmission parameters, and/or other BS or UE characteristics/parameters (e.g., scheduled activities, QoS constraints, application types or priority, use case types or priority, and/or other information).

That is, the TCC receives (e.g., from the network managers 150 or other PE entities), for each PE node in a geographical area of interest, a desired TDD configuration and network information indicative of coverage and interference areas for each of the base station (and possibly UE) nodes of the respective mobile network or network owner/operator within a geographical area of interest. The information indicative of the coverage and interference areas of a node may comprise, illustratively, one or more of a measured or calculated coverage and interference areas of the node (e.g., such as by the respective provider), a node site location, a node antenna height, a node RF filter and antenna characteristics, a node transmission parameters, and corresponding information for UEs, if possible.

The information enables the TCC to calculate or otherwise determine node coverage areas or coverage area contours and, therefore, the overlapping of such coverage areas and also interference areas or interference coupling or edges between nodes The TCC may also use known wireless standard (such as 3GPP) or regulatory limits for RF transmission and reception, such as out of band emissions, in band emissions, blocking, out of band selectivity, in band selectivity, etc. Other information received by the TCC may comprise one or more of identification of owner/operator, other BS or UE parameters (e.g., scheduled activities, QoS constraints, application types or priority, use case types or priority, and/or other information).

At step 320, the method 300 optionally generates graphical or other type of representation of all nodes and coverage areas/contours in the area(s) of interest for each of the relevant Network Systems operators. It is noted that this step is useful in visualizing the issues, but not necessary to the embodiments.

At step 330, the method 300 identifies any node clusters within the area(s) of interest. That is, at step 330 overlap within the coverage areas of the various nodes within the area(s) of interest is used to determine whether or not multiple clusters of nodes exist. For example, if a graphical representation was generated at step 320 including the coverage area of each of the nodes, then the groups of nodes having contiguous overlapping coverage areas with form respective clusters.

Steps 320-330 contemplate that the network information indicative of node coverage and interference areas received at step 310 may be used by the TCC or other management entity to determine the geographical coverage areas/contours of each of the various nodes, and then group those nodes having overlapping coverage areas into clusters. If the various nodes have differing desired TDD configurations, the TCC may determine which TDD configuration should be primarily used, which secondarily, and so on. Adjacent nodes, or nodes forming node pairs, with different desired TDD configurations are coordinated by the TCC selecting a common TDD configuration (e.g., the primary or secondary TDD configuration) based on various mechanisms/criteria.

At step 340, the method 300 examines each pair of nodes in each cluster of nodes having different desired TDD configurations to determine thereby an expected amount of node to node CLI. Optionally, at step 340 a determination is made as to an expected amount of UE to UE CLI. That is, a determination is made as to an amount of CLI attributable to UE associated with a first node in the node pair as experienced by the UE associated with a second node in the node pair.

In various embodiments, the overlap coverage area may be divided into segments where each segment is associated with a corresponding amount of node to node and/or UE to UE CLI. In various embodiments, where overlap coverage areas may be allocated to specific PE node sectors or antennas, CLI-reducing adjustments may be made with respect to only those sectors or antennas of the PE node.

At step 350, an edge is defined where an expected amount of node to node CLI exceeds a threshold level. Optionally, an edge may be defined where any expected amount of UE to UE CLI exceeds a threshold value. Further, the threshold value may be adjusted based upon where within an overlap region the UE is located, such as mentioned above with respect to step 340.

A threshold or threshold level such as for interference may be defined in terms of interference above an objective measurement, interference sufficient to reduce QoS to below an allowed QoS level, interference sufficient to cause a bit error rate (BER) above a predetermined amount, interference sufficient to require the use of forward error correction (FEC) other error correction/mitigation techniques beyond a desired level (e.g., in term of processing time, bandwidth loss, and/or other criteria), and so on.

CLI Computation

In one embodiment, CLI between a pair of base station nodes (BS1 and BS2) desiring different TDD configurations is determined as follows:

A first Interference Value (IV1) for Node2 CLI to Node1 is computed. If Node1 requests BS coordination, the estimated CLI amount is determined at the BS1 antenna port due to BS2 radio transmission using propagation models, transmission parameters, filter and antenna characteristics for BS1 and BS2 and spectrum emission mask (SEM) for BS2.

An interference metric (IM) for BS1 is created by transforming an interference amount (I) in dBm to a value between 0 and 1 as follows:

$$IM = \begin{cases} \dfrac{I - I_{min}}{I_{max} - I_{min}}, & \text{if } I_{min} < I < I_{max} \\ 0, & \text{if } I \leq I_{min} \\ 1, & \text{if } I \geq I_{max} \end{cases}$$

Where $I_{min}$ and $I_{max}$ for a given BS are parameters determined by the TCC. A TCC administrator can use consistent values for $I_{min}$ and $I_{max}$ with other TCC administrators or it can determine $I_{min}$ and $I_{max}$ suitable for different use cases as it prefers.

If both nodes are frame synchronized, then only UL subframes and UL special subframe symbols of BS1 that overlap with DL subframes and DL special subframe symbols of BS2 are considered in determining the interference metric.

If any of the two BSs is not frame synchronized, then the most possible overlap of BS1 UL subframes and UL symbols with BS2 DL subframes and DL symbols may be assumed for worst-case impact. Alternatively, the average value of the overlap may be assumed for expected impact.

If both of nodes BS1 and BS2 are frame synchronized, then only UL subframes and UL special subframe symbols of BS1 that overlap with DL subframes and DL special subframe symbols of BS2 are considered in determining the interference metric. If any of the two BSs is not frame synchronized, then the most possible overlap of BS1 UL subframes and UL symbols with BS2 DL subframes and DL symbols may be assumed for worst-case impact. Alternatively, the average value of the overlap may be assumed for expected impact.

The fraction of overlap of the transmission frames of the two BSs is multiplied with the IM to determine the Interference Value (IV), as follows: IV=X*IM, where X is the fraction of overlap.

Optional UE Coordination. If BS1 requests UE coordination. The CLI amount is estimated at UE1 antenna port due to UE2 radio transmission using propagation models, transmission parameters, filter and antenna characteristics for UE1 and UE2 and as well as spectrum emissions mask (SEM) of UE2.

An interference metric (IM) for UE1 is created by transforming an interference amount (I) in dBm to a value between 0 and 1, as with the BS coordination described above:

$$\begin{cases} \dfrac{I - I_{min}}{I_{max} - I_{min}}, & \text{if } I_{min} < I < I_{max} \\ 0, & \text{if } I \leq I_{min} \\ 1, & \text{if } I \geq I_{max} \end{cases}$$

Where $I_{min}$ and $I_{max}$ for a given UE are parameters determined by the TCC. A TCC administrator can use consistent values for $I_{min}$ and $I_{max}$ with other TCC administrators or it can determine $I_{min}$ and $I_{max}$ suitable for different use cases as it prefers.

UE1 and UE2 locations are the closest or worst possible locations in the coverage of their respective BSs at nominal antenna heights (e.g. 1.5 m for mobile UEs, 6 m for stationary customer premises equipment (CPE)). BS coverages are determined using propagation models based on a nominal value, such as −6 dBm (for example).

If both BSs are frame synchronized, then only DL subframes and DL special subframe symbols of BS1 that overlap with UL subframes and UL special subframe symbols of BS2 are considered in determining the interference metric. If any one of the two BSs is not frame synchronized, then the most possible overlap of BS1 DL subframes and DL symbols with BS2 UL subframes and UL symbols may be assumed for worst-case impact. Alternatively, the expected value of the overlap may be assumed for expected impact A second Interference Value (IV2) for Node1 CLI to Node2 is computed in the same manner as described above with respect to the first Interference Value (IV1).

If Node1 indicates BS coordination and Node2 indicates UE Coordination, IV1 is calculated assuming both nodes are using BS Coordination methodology. Also, IV2 is calculated assuming both nodes are using UE Coordination Methodology At step 360, for each node pair having an edge there between, a common TDD configuration is selected for use at both nodes forming the node pair in accordance with an agreed criteria. The first and second PE nodes in a PE node pair are associated with respective first and second desired TDD configurations. The TDD configuration selected for common use may be whichever of the first and second desired TDD configurations is associated with a greater number of PE nodes in the cluster, or a greater cumulative coverage area in the cluster, or a greater or lesser Quality of Service (QoS) level, or a higher priority application or use case, or some other determining criteria. For those nodes that are not associated with an edge, they may use their respective desired TDD configurations. That is, the common TDD configuration for a cluster of nodes may be determined by majority voting, Quality of Service (QoS) level or cumulative coverage of the nodes requesting the same configuration.

Edge Weight Computation

The Edge Weight (EW) between Node1 and Node2 is defined as the maximum of IV1 and IV2 as described above with respect to step 340.

A Common Edge Weight (CEW) between two nodes is determined by the managing TCC(s) of the two nodes. If the two nodes are managed by different TCCs, the managing TCCs of those nodes exchange their EW values for those nodes in order to create edges consistently across TCCs. Generally speaking, there may be one or more TCCs serving nodes in the same geographical, though any given node may be fully served a single TCC. As such, there will typically be no more than two TCCs of interest when considering interference pairwise.

According to exchanged EW values, each TCC calculates CEW based on the following equation:

$$CEW = \frac{p_1 EW_1 + p_2 EW_2}{p_1 + p_2}$$

Where $EW_i$ is Edge Weight provided by TCC-i, $p_i$ is a positive weighting factor specific to TCC-i (½ by default).

If two nodes are managed by the same TCC, CEW is equal to EW computed by the managing TCC Edge Determination An edge is created between two nodes if CEW is greater than an Edge Threshold (ET). The value of an ET may be determined by the TCC Administrators based on operational considerations. One or more edge-indicative metrics may be used as a basis for selecting an ET, such as a upper threshold level of a loss of capacity or coverage area (e.g., a loss exceeding x % of capacity or coverage area), a performance degradation (e.g., a performance degradation/reduction exceeding y % of one or more performance metrics), a reduction in QoS (e.g., a reduction exceeding z % of one or more QoS indicators), and/or other edge indications.

No Edge is created between any pair of nodes belonging to the same operator or operators desiring the same TDD configuration.

An edge can be removed by changing transmission parameters for one or multiple nodes such as reducing transmit power or increasing antenna tilt to remove CLI impact between nodes.

An operator may waive CLI impact to its own nodes while choosing a non-mandatory TDD configuration. In this case edges are only determined when CLI impact is caused to other operators' nodes by the former operator. For example, an operator may need a certain TDD configuration, such as a UL-heavy configuration to serve high-UL traffic, while the selected configuration is DL-heavy. In this case, the operator may decide to take the risk of experiencing base station to base station interference.

In a cluster where the total number of TDD configurations requested is more than two, the process may be applied sequentially. For example, the process starts with the nodes with the most requested TDD configuration (1) vs the nodes with the second most requested TDD configuration (2). This process results in a decision on whether the second nodes can use their desired TDD configuration (2) or have to use the most requested configuration (1). After this, the process starts with the third nodes with the third most requested configuration vs the first and second nodes with the decided TDD configurations. This results in a decision on whether the third nodes can use their desired TDD configuration (3) or have to use the most requested configuration (1) or the second most requested configuration (2).

An operator may have some nodes in a cluster that have to use the common TDD configuration as stipulated by the TCC while other nodes in the same cluster that may use their desired TDD configuration, different from the common TDD configuration. However, if the two types of nodes of the same operator have overlapping coverages then the operator may not want to use two different TDD configurations and elect to use the common TDD configuration for all of its nodes.

Nodes may request more than two TDD configurations, and may do so in order of priority. For example, Network A with X nodes may request TDD Config 2 and TDD Config 1 as its first and second priority, respectively. Network B with Y nodes may request TDD Config 1 and TDD Config 2 as its first and second priority. Network C with Z nodes may request TDD Config 0 and TDD Config 1 as its first and second priority. In this case, the TCC may start with the first priority choices and try to accommodate as many nodes with their secondary choices, if possible. The TCC may also try to find a solution (for TDD configurations) for the cluster based on an overall spectrum utility or another metric. The TCC may also reconfigure transmission parameters to accommodate desired TDD configurations. For example, it may ask some nodes to reduce their transmit power or increase their antenna tilt such that an Edge Threshold may be avoided between two nodes.

Figure 4:
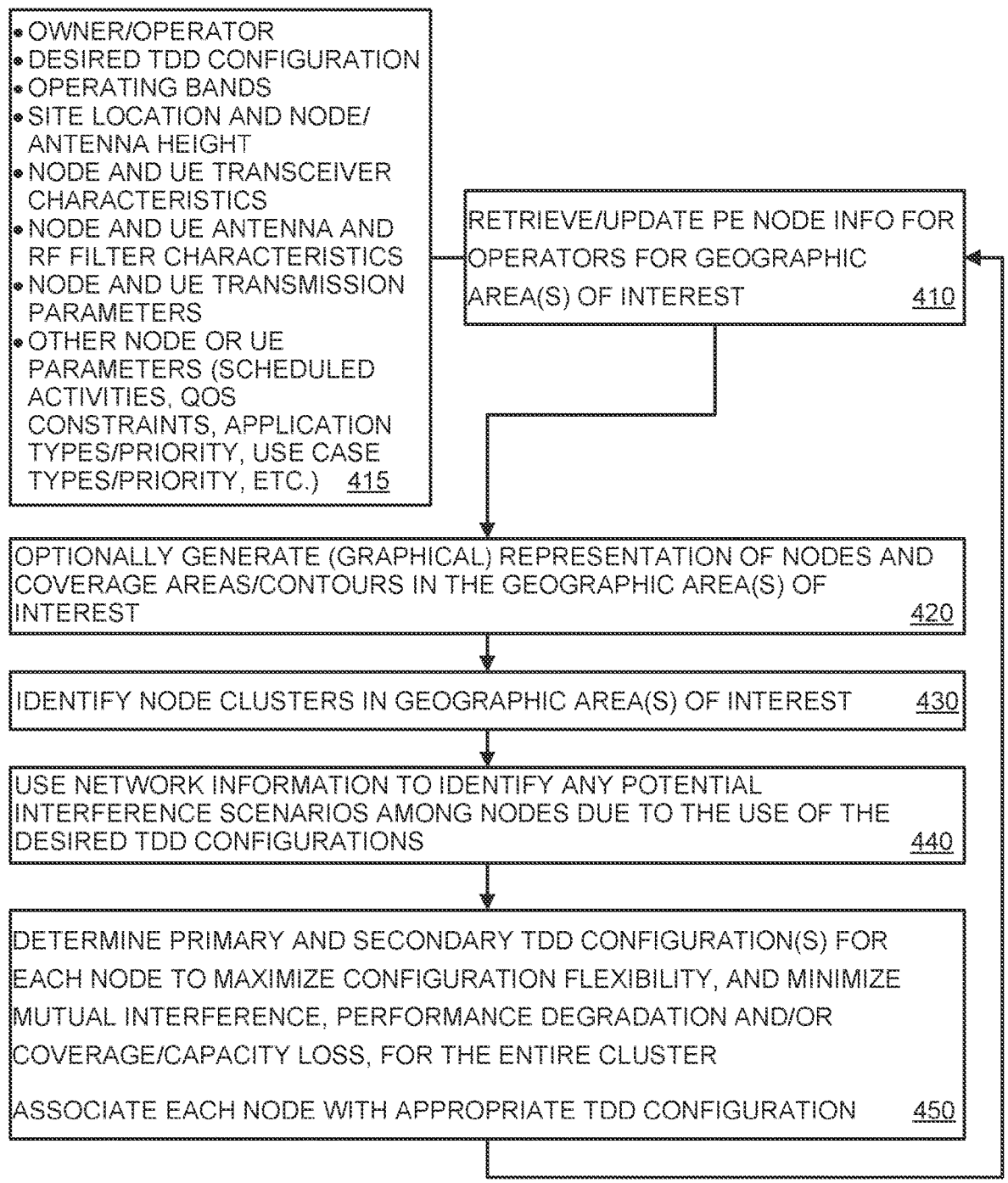
FIG. 4 depicts a TDD management method according to another embodiment.

FIG. 4 depicts a TDD management method according to another embodiment. Specifically, FIG. 4 depicts a method 400 suitable for use by the TCC 145 to automatically manage TDD configuration and transmission parameters such as for PE nodes of multiple wireless networks located in proximity of each other operating on adjacent TDD channels and/or bands in a manner tending to reduce cross link interference (CLI).

Steps 410-430 of the method 400 of FIG. 4 operate in substantially the same manner as described above with respect to steps 310-330 of the method 300 of FIG. 3.

For example, the TCC may be configured to identify or determine nodes or node pairs having overlapping coverage areas and different desired TDD configurations, in which case the TCC determines the interference and assigns a common TDD configuration to both nodes in the node pair if the interference is below a threshold. The TCC may generate one or more messages configured to cause assignment of determined TDD configurations to nodes in the geographical area of interest, such as messages transmitted to the network managers associated with the respective nodes.

At step 440, the TCC uses network information to identify any potential interference scenarios among nodes due to the use of the desired TDD configurations of the various nodes.

At step 450, the TCC identifies or determines primary and any available desired secondary TDD configuration(s) for each node so as to improve the TDD configuration selection process in a manner that maximizes configuration flexibility, and minimizes mutual interference, performance degradation and/or coverage/capacity loss, for the entire cluster.

Steps 440-450 provide for the determination potential interferences based upon one or more levels of prioritized desired TDD configurations. Various factors considered to reach TDD configuration assignments that balance tradeoffs for the entire cluster include selection criteria may utilize a number of PE nodes in the cluster associated with each desired TDD configuration, an amount of cumulative coverage area in the cluster of nodes associated with each desired TDD configuration, a greater or lesser Quality of Service (QoS) level associated with each desired TDD configuration, a higher/lower priority application or use case of nodes associated with each desired TDD configuration, or some other determining criteria. The result may be a hierarchy of common TDD configurations to be applied in subsequent steps of the method 400. That is, the common TDD configuration for a cluster of nodes may be determined by majority voting, Quality of Service (QoS) level or cumulative coverage of the nodes requesting the same configuration.

The TCC may be configured to periodically or even continually process each of a plurality of individual geographical areas of interest or node groups of interest and the like of one or more mobile network footprints to effect, thereby, a continual "tuning" of the BS parameters. In which case, the method 400 repeats steps 410-450.

In various embodiments, the TCC may select, for each pair of nodes having overlapping coverage areas, an allowed/desired TDD configuration among the pair of nodes that is hierarchically highest. This selection is made either (1) always; (2) only if the determined node to node CLI exceeds a threshold level; or (3) only if the determined UE to UE CLI exceeds a threshold level.

In various embodiments, received network information indicative of node coverage and interference areas, and desired TDD configurations, is used to identify any potential interference scenarios among the nodes due to the use of their respective and possibly varied desired TDD configurations. Further for each node a determination is made as to the allowed TDD configurations for that node so as to avoid interference with other TDD nodes and, optionally, FDD nodes. Further, each node is associated with one or more allowed TDD configurations.

It is noted that spectrum bands designated to be frequency domain duplex (FDD) have separate frequency assignments for downlink (DL) and uplink (UL) operation. The UL and DL portions are separated in frequency to avoid interference. However, spectrum bands designated to be time domain duplex (TDD) have one common frequency assignment for both DL and UL operation whereas the operations are separated in time domain. The various embodiments address conditions where there are TDD nodes adjacent other TDD nodes, and where there are TDD nodes adjacent FDD nodes.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative"). A specific example modification is that the TCC not only controls the TDD configurations, but also various UE transmission parameters, such as node or UE transmit powers, to avoid interference.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A time domain duplex (TDD) configuration controller apparatus, comprising:
 digital processor apparatus; and
 computer readable apparatus in data communication with the digital processor apparatus and comprising a non-transitory storage medium, the non-transitory storage medium comprising at least one computer program having a plurality of instructions which are configured to, when executed on the digital processor apparatus, cause the TDD configuration controller apparatus to:
 receive first data associated with a plurality of nodes, the first data comprising data indicative of node coverage for each of the plurality of nodes and a plurality of desired TDD configurations;
 utilize the first data to identify potential interference among two or more of the plurality of nodes of at least two respective different networks and having an overlapping coverage area;

determine, for the two or more of the plurality of nodes, one or more allowed TDD configurations to avoid or mitigate the potential interference within at least a portion of the overlapping coverage area; and provide two or more of the plurality of nodes with the one or more allowed TDD configurations, respectively.

2. The TDD configuration controller apparatus of claim 1, wherein the utilization of the first data to identify the potential interference among the two or more of the plurality of nodes comprises determining one or more interference areas between at least a portion of the plurality of nodes.

3. The TDD configuration controller apparatus of claim 1, wherein the one or more allowed TDD configurations are adapted in in accordance with at least one of (i) frame, (ii) subframe, (iii) special-subframe-symbol, (iv) uplink or downlink direction, or (v) timing with frame synchronization.

4. The TDD configuration controller apparatus of claim 1, wherein the utilization of the first data to identify the potential interference among the two or more of the plurality of nodes comprises a determination of the potential interference via use of uplink (UL) subframes and UL special subframe symbols of a first node of the two or more of the plurality of nodes that overlap with DL subframes and DL special subframe symbols of a second node of the two or more of the plurality of nodes.

5. The TDD configuration controller apparatus of claim 1, wherein the first data further comprises data indicative of at least one of (i) geographical location, (ii) transmission parameters, (iii) transceiver characteristics, (iv) filter characteristics, (antenna height, or (vi) one or more antenna patterns.

6. The TDD configuration controller apparatus of claim 1, wherein the one or more allowed TDD configurations comprise a common TDD configuration for a portion of the plurality of nodes in a geographical cluster whose potential for causing interference to one or more other nodes of the plurality of nodes in the geographical cluster is determined to exceed a threshold level.

7. The TDD configuration controller apparatus of claim 6, wherein the one or more allowed TDD configurations further comprise at least one of the plurality of desired TDD configurations different from the common TDD configuration for a second portion of the plurality of nodes whose potential for causing interference to the one or more other nodes of the plurality of nodes in the geographical cluster is determined to not exceed a threshold level.

8. The TDD configuration controller apparatus of claim 6, wherein the common TDD configuration is determined by at least one of (i) majority voting, (ii) Quality of Service (QOS) level, or (iii) cumulative coverage of nodes having a same one of the plurality of desired TDD configurations.

9. The TDD configuration controller apparatus of claim 6, further comprising:

determining an amount of cross link interference (CLI) among base station nodes of the plurality of nodes desiring different TDD configurations; and requiring the common TDD configuration for the base station nodes only when the determined amount of CLI exceeds a threshold value.

10. The TDD configuration controller apparatus of claim 6, further comprising:

determining an amount of cross link interference (CLI) among user equipment nodes of the plurality of nodes desiring different TDD configurations; and requiring the common TDD configuration for the user equipment nodes only when the determined amount of CLI exceeds a threshold value.

11. The TDD configuration controller apparatus of claim 1, wherein the potential interference is characterized by at least one of a loss of coverage or capacity, degradation of performance, or reduction in QoS.

12. The TDD configuration controller apparatus of claim 1, wherein the plurality of nodes utilize a shared TDD spectrum band.

13. The TDD configuration controller apparatus of claim 1, wherein the plurality of nodes utilize adjacent TDD and frequency domain duplex (FDD) spectrum bands.

14. The TDD configuration controller apparatus of claim 1, wherein the plurality of desired TDD configurations comprise a TDD configuration for different nodes in a geographical area of interest, the different nodes managed by different entities that exchange information amongst each other to harmonize their selections of desired TDD configurations.

15. The TDD configuration controller apparatus of claim 1, further comprising determining allowed transmission parameters and providing each of the plurality of nodes with the allowed transmission parameters.

16. The TDD configuration controller apparatus of claim 1, further comprising receiving, from each of the plurality of nodes, information relating to the one or more allowed TDD configurations and transmission parameters adopted by the plurality of nodes, respectively.

17. A computerized method of managing time domain duplex (TDD) parameters of respective nodes of different mobile networks located in one or more geographical areas of interest and configured for wireless communication, the computerized method comprising:

obtaining first data related to the nodes, the first data comprising data indicating a desired TDD configuration for each node;

based on the first data, identifying one or more node clusters in the one or more geographical areas of interest;

for each pair of nodes in each of the one or more node clusters having different desired TDD configurations, determining an expected amount of node-to-node cross link interference (CLI);

defining an edge where the expected amount of node-to-node CLI exceeds a threshold level; and for each pair of nodes having an edge therebetween, selecting a common TDD configuration in accordance with one or more criteria;

wherein each pair of nodes having the edge therebetween comprises a pair of nodes having a first node associated with a first mobile network having a first operator and a second node associated with a second mobile network having a second operator different than the first operator.

18. Computer readable apparatus comprising a non-transitory storage medium, the non-transitory storage medium comprising at least one computer program having a plurality of instructions configured to, when executed on a processing apparatus of a computerized controller apparatus, cause the computerized controller apparatus to:

receive first data associated with two or more computerized user devices within at least two respective different mobile networks associated with respective different operators;

utilize the first data to identify cross link interference (CLI) between the two or more computerized user devices which meets or exceeds a prescribed threshold; and determine one or more allowed TDD configurations to reduce CLI to being below the prescribed threshold.

19. The computer readable apparatus of claim 18, wherein the two or more computerized user devices comprise a first computerized user device of an operator operating in uplink (UL) mode and a second computerized user device of an operator operating in downlink (DL) mode.

20. The computer readable apparatus of claim 18, wherein the one or more allowed TDD configurations comprise at least a primary TDD configuration and a secondary TDD configuration, the primary TDD configuration prioritized over the secondary TDD configuration.

* * * * *